UNITED STATES PATENT OFFICE.

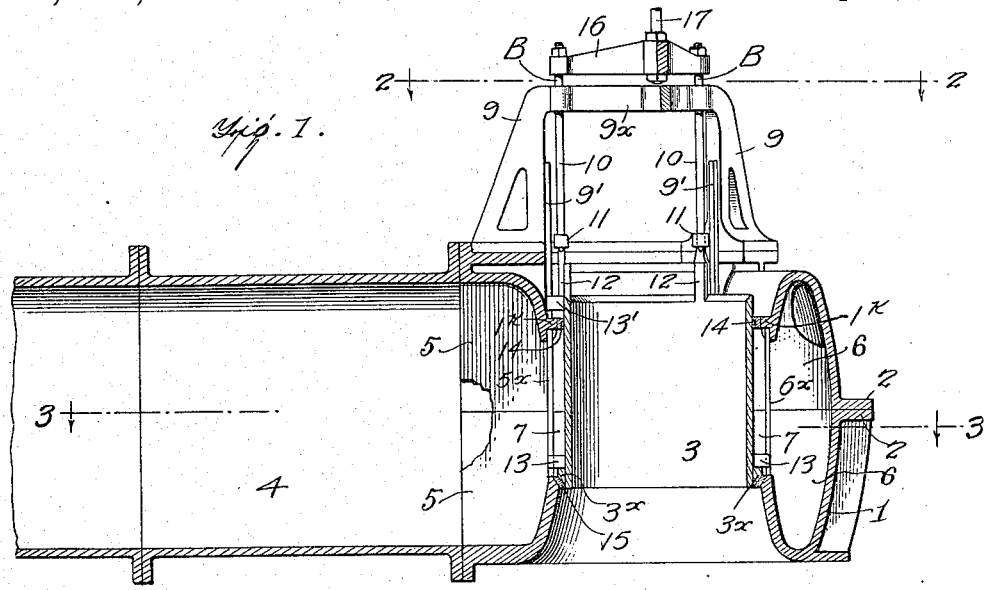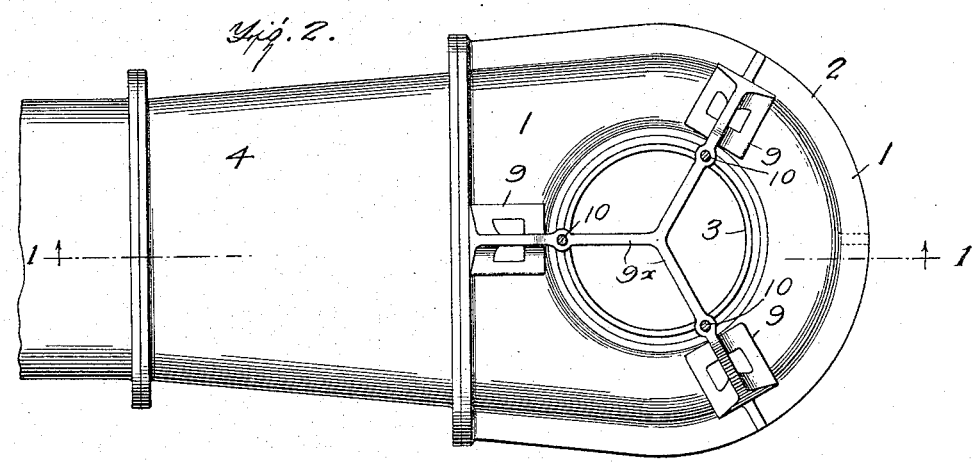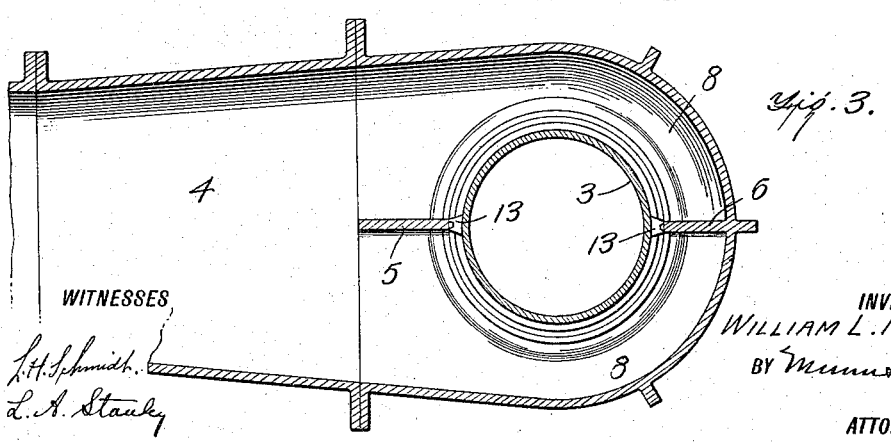

WILLIAM L. MARSHALL, OF WASHINGTON, DISTRICT OF COLUMBIA.

HYDRAULIC VALVE.

1,178,253.  Specification of Letters Patent.  Patented Apr. 4, 1916.

Application filed February 6, 1914.  Serial No. 816,911.

*To all whom it may concern:*

Be it known that I, WILLIAM L. MARSHALL, a citizen of the United States, and a resident of Washington, in the District of Columbia, have made certain new and useful Improvements in Hydraulic Valves, of which the following is a specification.

My invention relates to improvements in hydraulic valves, and it consists in the combinations, constructions, and arrangements herein described and claimed.

An object of my invention is to provide a hydraulic valve which allows the greatest possible discharge with the least weight of material in the moving parts, with the least motion and friction, and with forces acting on the valve which are balanced or in equilibrium in every direction and at every position of the valve.

Other objects and advantages will appear in the following specification and the novel features of the device will be particularly pointed out in the appended claims.

My invention is illustrated in the accompanying drawings forming part of this application in which—

Figure 1 is a vertical section through the valve and the pipe leading to the valve casing, Fig. 2 is a section along the line 2—2 of Fig. 1, the body portion of the device being shown in plan view, Fig. 3 is a section along the line 3—3 of Fig. 2.

Referring now to Fig. 1 I have shown therein one form of the device which is especially adapted to be used in connection with large reservoirs or similar bodies of water in which a considerable flow may be established or shut off as for instance for purposes of irrigation. The valve is designed to be submerged in the water and to be manipulated either manually or by power means, as will be explained later. In this form of the device I provide a valve casing 1 of the shape shown in the drawings. It will be observed that this casing consists of an upper and a lower casting, each having flanges such as those shown at 2 which may be secured together in any suitable manner. The casing is annular, and the main valve member 3 is disposed in the opening formed by the annular casing, as shown in the drawings. One side of the casing 1 is secured to a pipe 4 which may be either an inlet pipe or an outlet pipe. Disposed within the casing and forming an integral part thereof are plates 5 and 6. These plates are preferably on opposite sides of the valve 3 and the inner edges $5^x$ and $6^x$ of the plates terminate short of the valve, as will be seen from Fig. 1, thus leaving passage-ways 7 for the flow of water. The interior of the annular casing is preferably elliptical in section, as will be seen from the vertical section shown in Fig. 1, but may be made of any suitable cross section. This provides a space 8 for the flow of the water around the interior of the casing. Secured to the top of the casing are uprights 9 which bear at their tops integral cross arms $9^x$, the uprights 9 and the cross arms $9^x$ forming a yoke. Arranged to pass through openings in the cross members $9^x$ are rods 10 which are connected by means of couplings 11 with extensions 12 of the valve 3. The valve in this instance is a right cylinder. It is provided on its exterior with guide lugs 13 which are grooved as shown in Fig. 3 to engage the edges $5^x$ and $6^x$ respectively of the plates 5 and 6. The upper guide lugs 13′ are also provided and are arranged to engage the guide members 9′. The cylindrical valve member 3 bears against a packing ring 14 which is secured to the annular casing. The lower end of the valve member has an external flange $3^x$ which is beveled to form a tight fit on a ring 15 which is carried by the casing.

From the foregoing description of the various parts of the device the operation thereof may be readily understood.

The valve, as stated, is submerged in a body of water and may be used either as an outlet or an inlet valve. Consider now the conditions when the valve is submerged and in its closed position. The bottom and top of the valve casing being open, pressure in the direction parallel to the axis of the cylindrical valve will be equal in both directions. Pressure at right angles to the axis of the cylindrical valve on the interior of the valve 3 will also be equalized around the entire inner surface of the valve. When it is desired to permit a flow of water out through the pipe 4 the valve 3 may be raised. To this end I provide a cross head 16 to which is secured a rod 17. The latter may be manipulated in any suitable manner either by hand or by external power devices. The opening of the valve will permit the water to enter from above and from below when the valve is set in the vertical position shown in Fig. 1. It will then flow into the passage 8 as well as directly toward the pipe 4. This permits the passage of a relatively large amount of water, but since the forces on the valve are balanced there is no undue pressure on any one particular part which tends to make the valve bind. The lugs 13 act as stop members so as to limit the movement of the valve when they come in contact with the annular flange 1$^k$. It will be noted that the rods 10 are so placed as to be protected by the standards 9 against pressure due to the rapid flow of water into or out of the cylinder or valve and the standards 9 are so disposed as not to obstruct full and free flow into or out of the cylinder or valve. It will also be noted that the interior of the moving cylinder is unbroken and not obstructed, offering full and free flow throughout. When it is desired to close the valve it is moved in the opposite direction. In this case, as in the case where the valve is opened, the forces acting on it are balanced so that it requires very little effort to move the valve into closed position. When in position the flanges 3$^x$ rest upon the ring 15, the latter constituting a valve seat. It will be observed that the valve is guided externally by the guide members 5$^x$ and 6$^x$ which are engaged by the lugs 13 and the guide members 9' which are engaged by the lugs 13'. In case the pipe 4 should act as the inlet pipe the conditions of equilibrium are still maintained, for it will be apparent that with the valve closed as shown in Fig. 1 pressure exerted by the water against the outer surface of the valve will be equal on all sides thereof, since the pressure from the pipe 4 will be transmitted undiminished to the water passage 8 which surrounds the valve. As the valve is opened the water has a chance to flow not only from the bottom of the valve casing, but also through the top of the valve casing by means of the cylindrical valve itself. Back pressure is therefore relieved by providing this double outlet. A large flow of water may therefore be controlled by means of the valve owing to the fact that it not only permits a flow through the valve casing, but also through the valve.

It will be observed that the pressure is so equalized on the different parts of the valve that it may be made of relatively light material. The effective force tending to resist the movement of the valve in the direction of its axis is that due to the weight of the valve and any small friction which may exist, this being a comparatively negligible quantity. The valve may be made of thin material, such as boiler plate, and therefore costs much less than those valves which have to withstand enormous compression pressures and which have to be thick castings to be operated against this pressure.

The apparatus as a whole is comparatively simple and is easily installed at a comparatively low cost.

I claim:—

1. A hydraulic valve mechanism comprising a casing having a central cylindrical opening extending entirely through the casing, a cylindrical valve open at both ends and adapted to enter said central opening, said casing having an annular water chamber of elliptical cross section surrounding said central opening, said annular water chamber being in communication with said central opening, a bearing for said cylindrical valve near one end of said central opening, guide rods disposed at the junction between the annular water chamber and the central opening, said guide rods being parallel to the direction of movement of the valve, and guide lugs carried by said valve and arranged to slide on said guide rods.

2. A hydraulic valve mechanism comprising a casing having a central cylindrical opening extending entirely through the casing, a cylindrical valve open at both ends and adapted to enter said central opening, said casing having an annular water chamber of elliptical cross section surrounding said central opening, said annular water chamber being in communication with said central opening, a bearing for said cylindrical valve near one end of said central opening, guide rods disposed at the junction between the annular water chamber and the central opening, said guide rods being parallel to the direction of movement of the valve, and guide lugs carried by said valve and arranged to slide on said guide rods, said guide lugs being arranged to engage said bearing to limit the movement of the valve.

WILLIAM L. MARSHALL.

Witnesses:
L. P. LITTLEPAGE,
BURNIE LOVE.